United States Patent
Sonoda et al.

(10) Patent No.: US 7,447,402 B2
(45) Date of Patent: Nov. 4, 2008

(54) LIGHT BEAM SCANNING DISPLAY

(75) Inventors: Shinichiro Sonoda, Kanagawa (JP);
Koichi Kimura, Kanagawa (JP);
Hiroshi Minatogawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 115 days.

(21) Appl. No.: 11/318,538

(22) Filed: Dec. 28, 2005

(65) Prior Publication Data

US 2006/0138239 A1  Jun. 29, 2006

(30) Foreign Application Priority Data

Dec. 28, 2004   (JP)   ............................ P.2004-379101

(51) Int. Cl.
*G02B 6/26* (2006.01)
(52) U.S. Cl. ............................................ 385/31; 385/33
(58) Field of Classification Search .................. None
See application file for complete search history.

(56) References Cited

U.S. PATENT DOCUMENTS

| | | | | |
|---|---|---|---|---|
| 5,293,437 A | * | 3/1994 | Nixon | 385/115 |
| 5,485,225 A | * | 1/1996 | Deter et al. | 348/804 |
| 6,175,440 B1 | | 1/2001 | Conemac | |
| 6,865,309 B2 | * | 3/2005 | Dho | 385/15 |
| 7,015,983 B2 | * | 3/2006 | Saccomanno | 348/758 |

FOREIGN PATENT DOCUMENTS

JP    2002-344765    11/2002

* cited by examiner

*Primary Examiner*—Sung H Pak
(74) *Attorney, Agent, or Firm*—Sughrue Mion, PLLC

(57) ABSTRACT

A light beam scanning display for displaying an image on a drawing screen by modulating laser beams from three primary color light sources, the three primary color light sources being arranged in close vicinity to each other, based on image data respectively and then scanning the laser beams, the light beam scanning display comprising: a parallelizing section that parallelizes respective laser beams; wherein the laser beams being parallelized by the parallelizing section to form one pixel of a drawn image on the drawing screen via different optical paths such that optical axes of the laser beams do not overlap with each other.

12 Claims, 12 Drawing Sheets

LIGHT BEAM SCANNING DISPLAY

BACKGROUND OF THE INVENTION

1. Field of the Invention

The present invention relates to a light beam scanning display for displaying an image on a drawing screen by Using respective laser beams emitted from light sources in three primary colors.

2. Description of the Related Art

The laser display using the laser light as the light source is disclosed in JP-A-2002-344765, for example. According to this laser display, the video information is visualized by propagating a plurality of modulated laser lights, which are emitted from the laser light sources in three colors of red (R), green (G) and blue (B) respectively, via the same path and then inputting the laser lights into the deflecting means to scan in the horizontal direction and the vertical direction.

Also, as another laser display, the laser display for guiding the laser lights emitted from the RGE laser arrays as individual light source lights by using the optical fiber is set forth in JP-A-2002-344765.

However, the laser display set forth in JP-A-2002-344765 is constructed such that the laser beams emitted from three light sources are collected onto the same path by the dichroic mirror. That is, three light source units, optical paths for propagating the laser beams from these light sources, etc. must be provided. Thus, an increase in size of the display is hardly avoidable.

Also, in the laser display set forth in U.S. Pat. No. 6,175,440, there are such disadvantages that, because a number of light sources are provided, a power required to drive respective lasers is increased and also it is difficult to reduce a size of the display.

The laser light is excellent in monochromaticity and directivity. Thus, if the laser light is used as the light source light, such advantages can be achieved that the color reproduction property can be enhanced and also a size of the optical system of the display can be reduced. However, because of the arrangement of the light sources and the provision of the optical system, etc., actually the configuration of the display becomes still complicated and thus a size reduction is not satisfactory.

SUMMARY OF THE INVENTION

The present invention has been made in view of the above circumstances, and it is an object of the present invention to provide a light beam scanning display, capable of attaining a reduction in size of a light source and an optical system while saving a power.

The above object can be achieved by the light beam scanning display according to the present invention.

(1) A light beam scanning display for displaying an image on a drawing screen by modulating laser beams from three primary color light sources, which are arranged in close vicinity to each other, based on image data respectively and then scanning the laser beams, includes a parallelizing section that parallelizes respective laser beams; wherein the laser beams being parallelized by the parallelizing section to form one pixel of a drawn image on the drawing screen via different optical paths such that optical axes of the laser beams do not overlap with each other.

According to this light beam scanning display, the laser beams that are parallelized by the parallelizing section constitute one pixel of the drawn image on the drawing screen via the different optical paths such that the optical axes of the laser beams do not overlap with each other. Therefore, the two-dimensional image can be formed by the configuration in which the light sources and the optical system are reduced in size and can attain a power saving.

(2) In the light beam scanning display according to (1), the parallelizing section contains lenses that are provided to correspond to the laser beams respectively.

According to this light beam scanning display, since the lenses are provided to correspond to respective laser beams, the laser beams emitted from the light sources are parallelized. Therefore, in scanning the beams, one pixel consisting of three primary colors can be projected onto locations that are positioned in close vicinity to each other.

(3) In the light beam scanning display according to (2), the lenses comprises at least one lens arranged to deviate its optical axis from a center of the laser beam.

According to this light beam scanning display, the optical axis of the lens is arranged to deviate from a center of the laser beam. Therefore, even when a distance between respective color light sources is short, the lens with a large diameter can be employed and thus a reduction in the optical characteristics due to a size of the lens can be prevented.

(4) In the light beam scanning display according to any one of (1) to (3), the three primary color light sources are sealed in one package.

According to this light beam scanning display, the light sources in three primary colors are sealed in the interior of one package. Therefore, the light sources themselves can be downsized largely.

(5) In the light beam scanning display according to (4), the lenses are sealed in an interior of the package.

According to this light beam scanning display, the light sources are sealed in the inside of one package. Therefore, the parallel lights can be emitted directly from the packaged light source, so that the optical paths can be simplified and also a size reduction of the overall display can be achieved.

(6) In the light beam scanning display according to any one of (2) to (5), the lenses are constructed as a lens array in which the lenses that parallelizes the laser beams respectively are integrated together.

According to this light beam scanning display, the lens array receives a plurality of laser beams and then parallelizes the laser beams respectively. Therefore, the adjustment of the optical axes is made simple in fitting the lens to the optical path, so that the fitting man-hour can be reduced and also the optical axes of the lenses can be aligned with high precision.

(7) The light beam scanning display according to any one of (1) to (3) further includes optical fibers for introducing the laser beams from the light sources respectively to transmit; wherein the parallelizing section contains lenses that are provided to light emergent sides of the optical fibers to parallelize emergent beams from the optical fibers.

According to this light beam scanning display, respective color laser beams can be led arbitrarily by the optical fibers. Therefore, a degree of freedom in arranging the optical paths can be increased, and thus a margin of, design can be improved.

DETAILED DESCRIPTION OF THE INVENTION

A preferred embodiment of a light beam scanning display according to the present invention will be explained with reference to the drawings hereinafter.

First Embodiment

Figure 1:
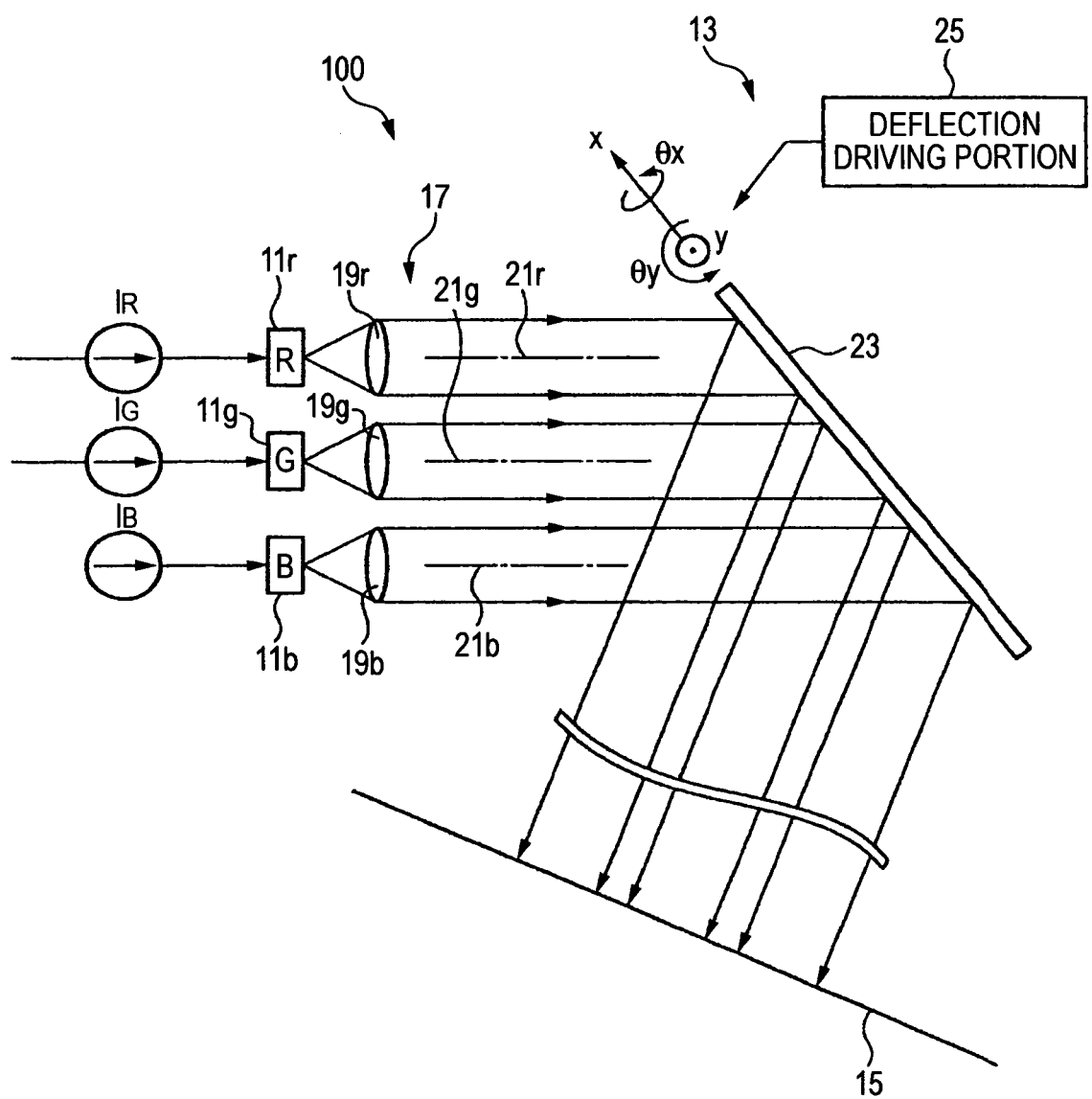
FIG. 1 is an overall configurative view showing schematically a light beam scanning display.
Figure 2:
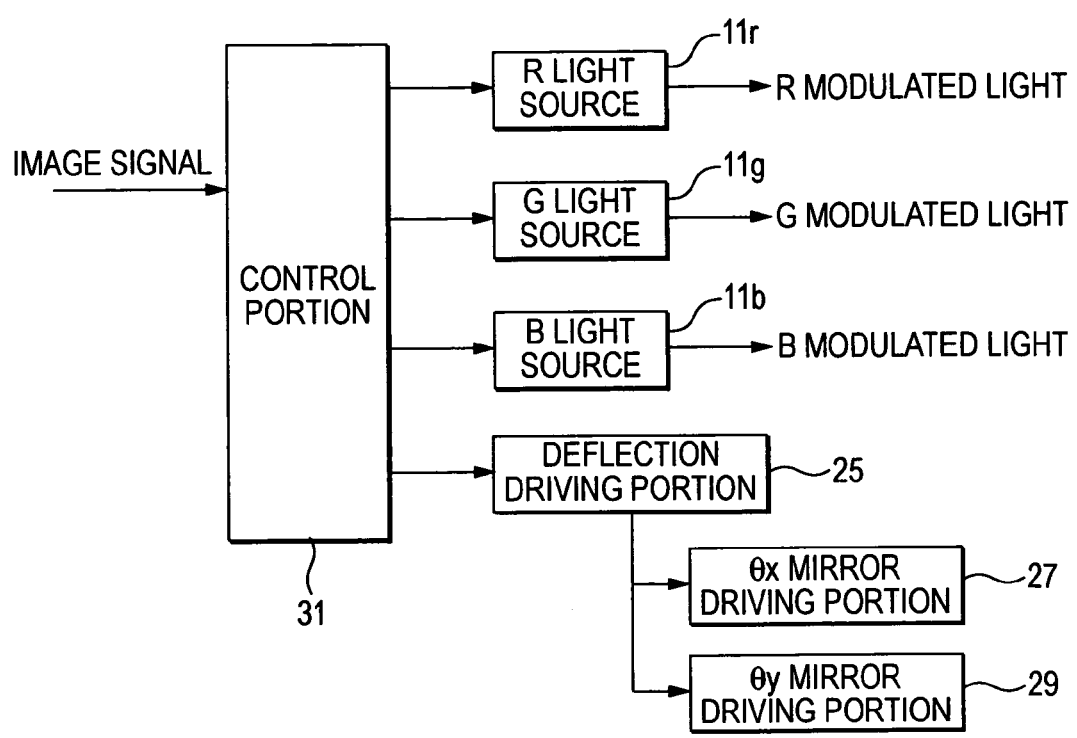
FIG. 2 is a control block diagram of the light beam scanning display.

FIG. 1 is an overall-configurative view showing schematically a light beam scanning display, and FIG. 2 is a control block diagram of the light beam scanning display.

A light beam scanning display 100 displays an image on a drawing screen 15 by converting the laser beams emitted from three primary color laser light sources arranged in neighboring positions respectively, i.e., an R light source 11r, a G light source 11g, a B light source 11b, into parallel beams by lenses as a parallelizing section, modulating the laser beams based on input image data, and scanning these laser beams by a deflecting section 13.

As the R light source 11r, a semiconductor laser using InGaP or InGaAlP quantum well formed on a GaAs substrate as an active layer can be employed.

As the G light source 11g, a semiconductor laser using InGaN formed on a GaN substrate as an active layer or a semiconductor laser using ZnCdSe formed on a ZnSe substrate as an active layer can be employed;

As the B light source 11b, a semiconductor laser using InGaN formed on a GaN substrate as an active layer can be employed.

The laser beams from these light sources 11r, 11g, 11b are modulated directly in response to the input image data.

This light beam scanning display 100 has lenses 19r, 19g, 19b, which are provided to correspond to respective laser beams, as a parallelizing section 17 that converts the laser beams into parallel lights. The laser beams that are parallelized by the lenses 19r, 19g, 19b constitute one pixel of the drawn image on the drawing screen 15 via different optical paths such that optical axes 21r, 21g, 21b of the laser beams do not overlap with each other.

The deflecting section 13 has a first rotation axis x positioned in the same plane as the alignment direction of the R light source 11r, the G light source 11g, and the B light source 11b, a mirror 23 turned around a second rotation axis y that intersect orthogonally with the first rotation axis x, a deflection driving portion 25 for turning/driving this mirror 23; The deflection driving portion 25 has a θx mirror driving portion 27 for driving the mirror 23 around the first rotation axis x (θx), and a θy mirror driving portion 29 for driving the mirror 23 around the second rotation axis y (θy).

Then, the drive control of respective portions is carried out by a control portion 31. That is, the control portion 31 modulates respective RGB colors based on the input image data, and the mirror 23 is deflected/driven to scan the laser beams emitted from the light sources in the horizontal/vertical directions.

Figure 3:
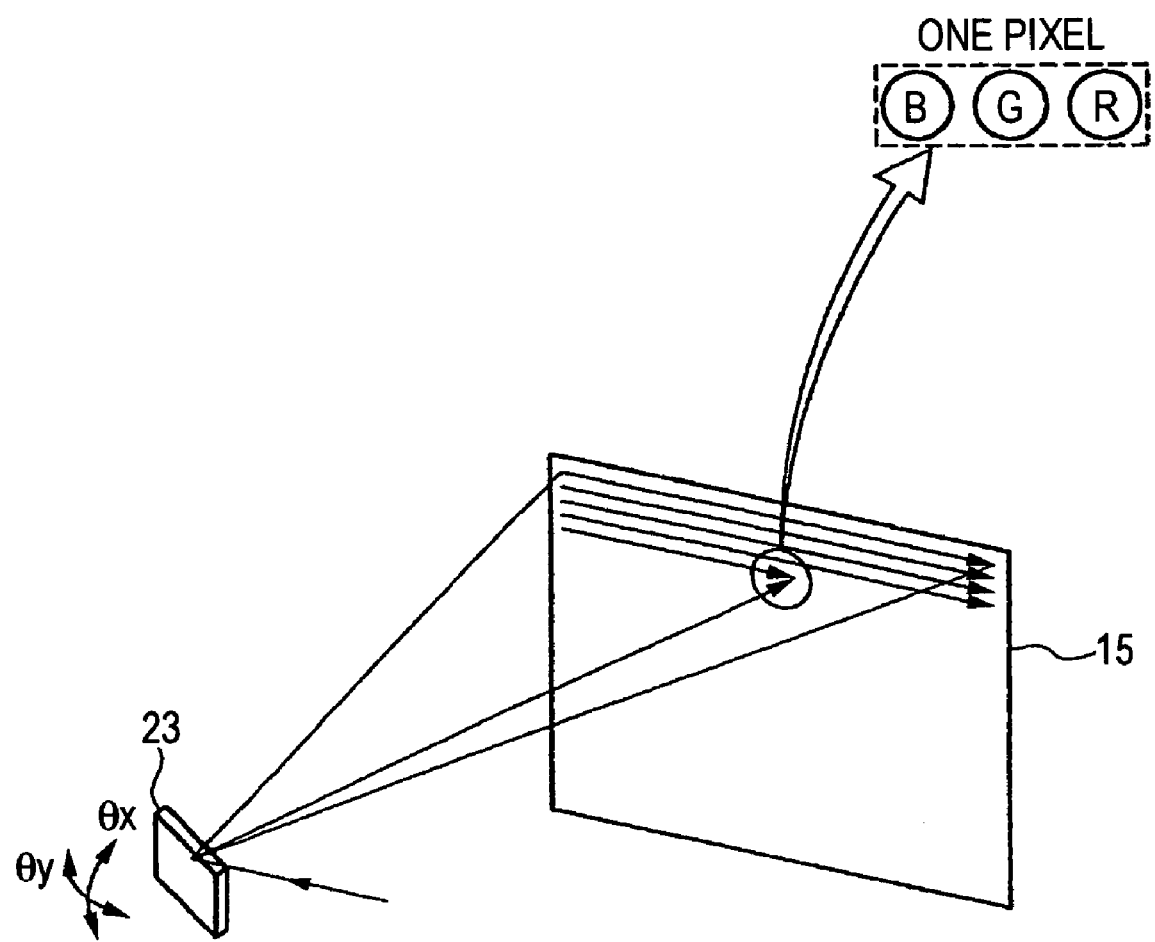
FIG. 3 is an explanatory view showing an example of how a laser beam is scanned on a drawing screen.

FIG. 3 is a explanatory view showing an example of how a laser beam is scanned on a drawing screen.

The RGB laser beams emitted from the light sources 11r, 11g, 11b are deflected by the mirror 23 in the horizontal direction and the vertical direction, and draw a two-dimensional video by the raster scan, or the like.

A dedicated screen is arranged as the drawing screen 15. Also, the laser beams can be irradiated onto a surface of the object such as a wall, or the like. Also, the drawing screen 15 may constructed as a transmission display by using a translucent screen.

According to this light beam scanning display 100, the RGB light sources 11r, 11g, 11b can be arranged in the neighboring positions, and the parallelized light beams can be irradiated from the light sources in parallel with each other. Therefore, even when the optical paths are changed by the deflecting section, the light beams of the RGB lights are irradiated onto the adjacent positions on the drawing screen 15 mutually and constitute one pixel.

In this manner, since the parallel laser beams are projected while being scanned on the drawing screen 15, the image having the color reproduction property can be displayed with high definition.

The laser beams emitted from the light sources cannot display simultaneously the same spot on the drawing screen 15. However, if these laser beams are scanned at a high speed, such laser beams can cause the human's eyeball to recognize a two-dimensional image by utilizing its afterimage phenomenon. Also, in order to display simultaneously the same spot, a displacement between bright spots in respective colors can be eliminated by changing respective light emitting timings of the light sources to have a time difference.

Here, as described above, the deflection driving portion 25 scans the laser beams two dimensionally by driving the mirror 23 by a driving signal consisting of a sinusoidal wave, a pulse wave, or a bilaterally symmetrical triangular wave. But it is preferable that a desired drawing should be carried out while providing appropriately a blanking period between an end portion of the scanning in the scanning-line direction and an end portion of the scanning in the direction perpendicular to that direction. In order to establish the scan starting position of the beam modulated based on the image data in the control portion 31 while providing the blanking period, a signal output from the light receiving element such as a photo diode, or the like which is arranged near the end portion of the horizontal or vertical scanning range of the laser beam may be employed. That is, the laser beams from the light sources are modulated to coincide in timing with the scanning state in such a manner that the end portion in the scanning in the scanning-line direction is set as the non-drawing area.

In this case, when the laser beams are scanned in the horizontal direction as the scanning direction one line by one line, the light receiving element is arranged in the blanking period on the scanning start side whereas, when the laser beams are scanned reciprocally in the horizontal direction, the light receiving element is arranged in the blanking period on the scanning start side and the scanning end side respectively. Accordingly, a drawing starting timing can be set precisely in drawing the image by scanning the laser beams, and thus the displacement of the depicted image is never generated.

Next, variations of the light beam scanning display according to the present embodiment will be explained hereunder.

<First Variation>

Figure 4:
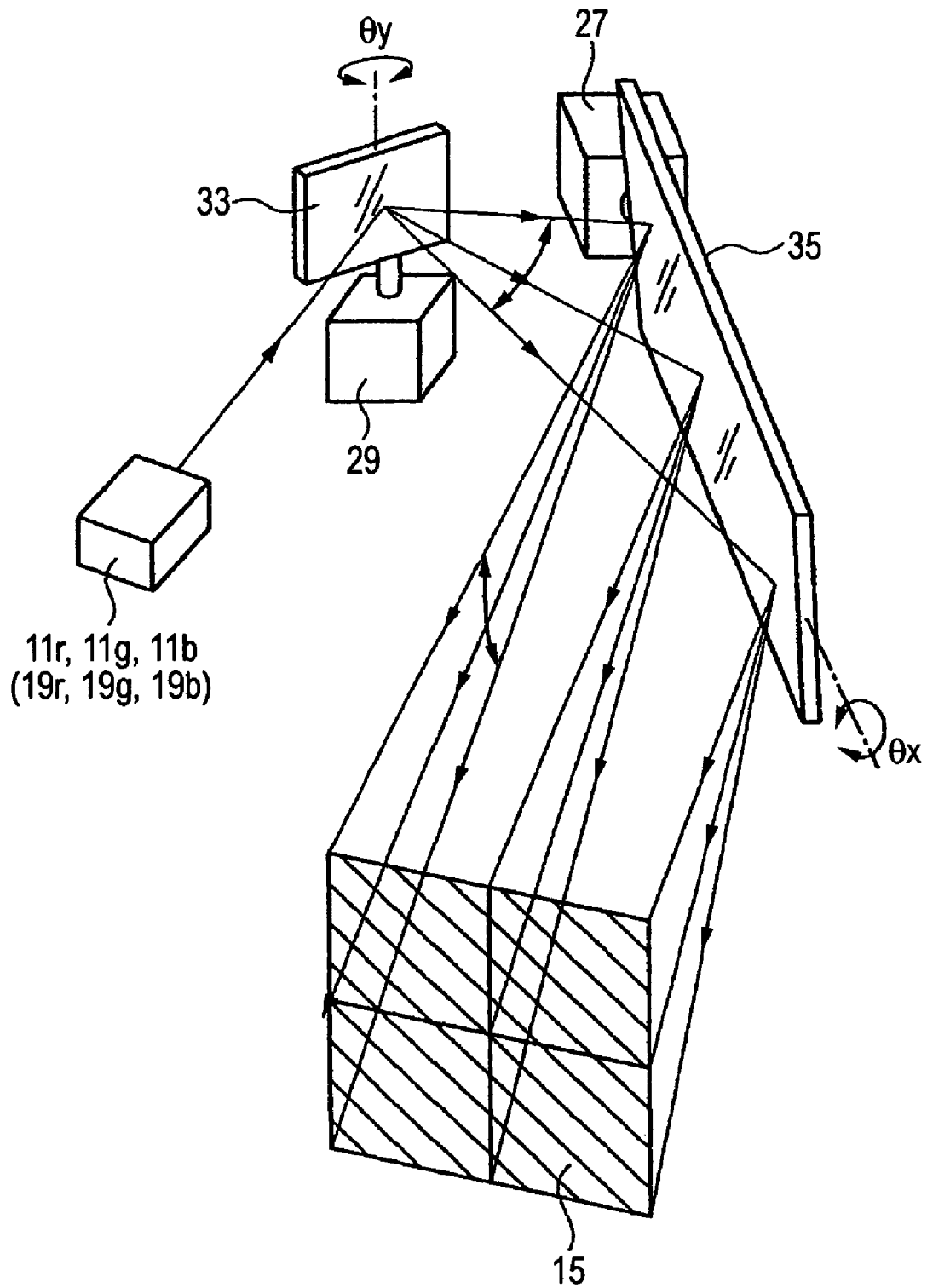
FIG. 4 is a principal configurative view of the light beam scanning display using galvano mirrors.

FIG. 4 is a principal configurative view of the light beam scanning display using galvano mirrors.

In the present embodiment, galvano mirrors 33, 35 are employed as the deflecting section, and the image is formed on the drawing screen 15 by deflecting the laser beams from the RGB light sources. That is, the horizontal scanning is carried out when the galvano mirror 33 is turned in the θy direction, and the vertical scanning is carried out when the galvano mirror 35 is turned in the θx direction. The electromagnetic motor can be used as the θx mirror driving portion 27 and the θy mirror driving portion 29.

According to this configuration, the relatively small galvano mirror 33 is used for the high-speed horizontal scanning, while the relatively large galvano mirror 35 is used for the vertical scanning. Therefore, the display can be carried out at an enough frame speed that is able to meet NTSC, for example, and has no trouble in practical use.

<Second Variation>

Figure 5:
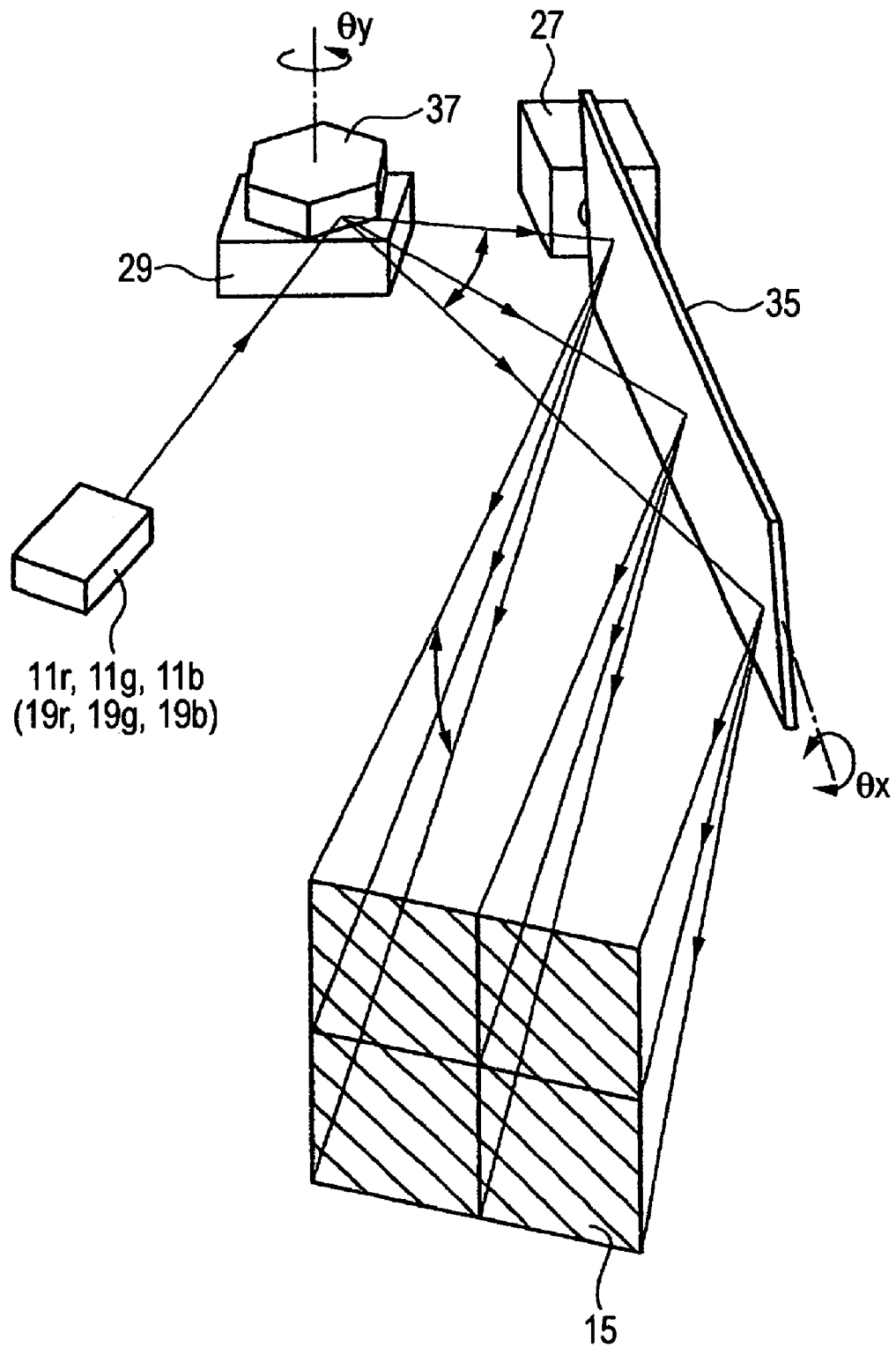
FIG. 5 is a principal configurative view of the light beam scanning display using a polygon mirror and the galvano mirror.

FIG. 5 is a principal configurative view of the light beam scanning display using a polygon mirror and the galvano mirror.

In the present variation, a polygon mirror 37 and the galvano mirror 35 are employed as the deflecting section. According to this configuration, a higher-speed scanning can be achieved because the horizontal scanning is carried out by using the polygon mirror 37, and therefore the higher-grade image can be drawn.

<Third Variation>

Figure 6:
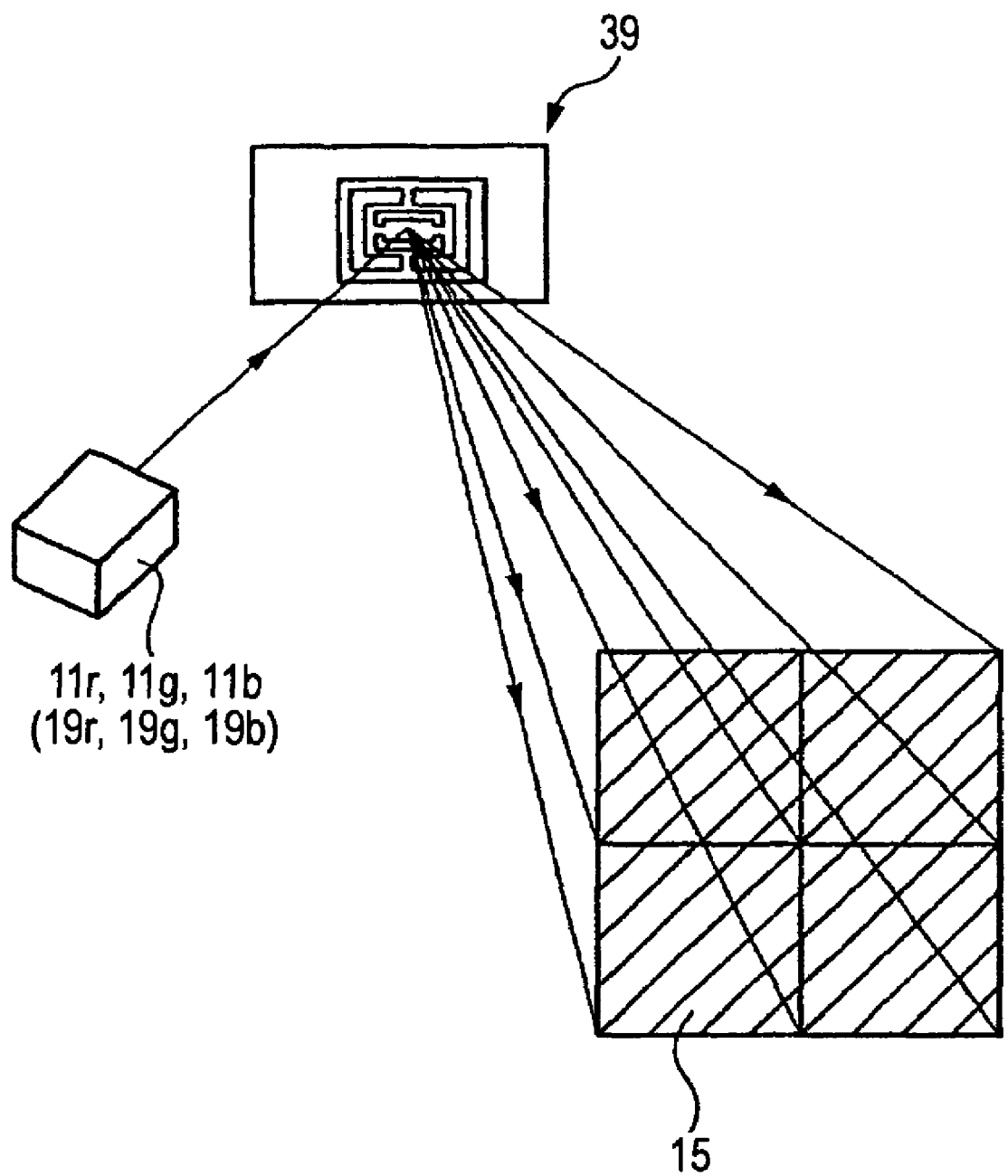
FIG. 6 is a principal configurative view of the light beam scanning display using a planar electromagnetic actuator.
Figure 7:
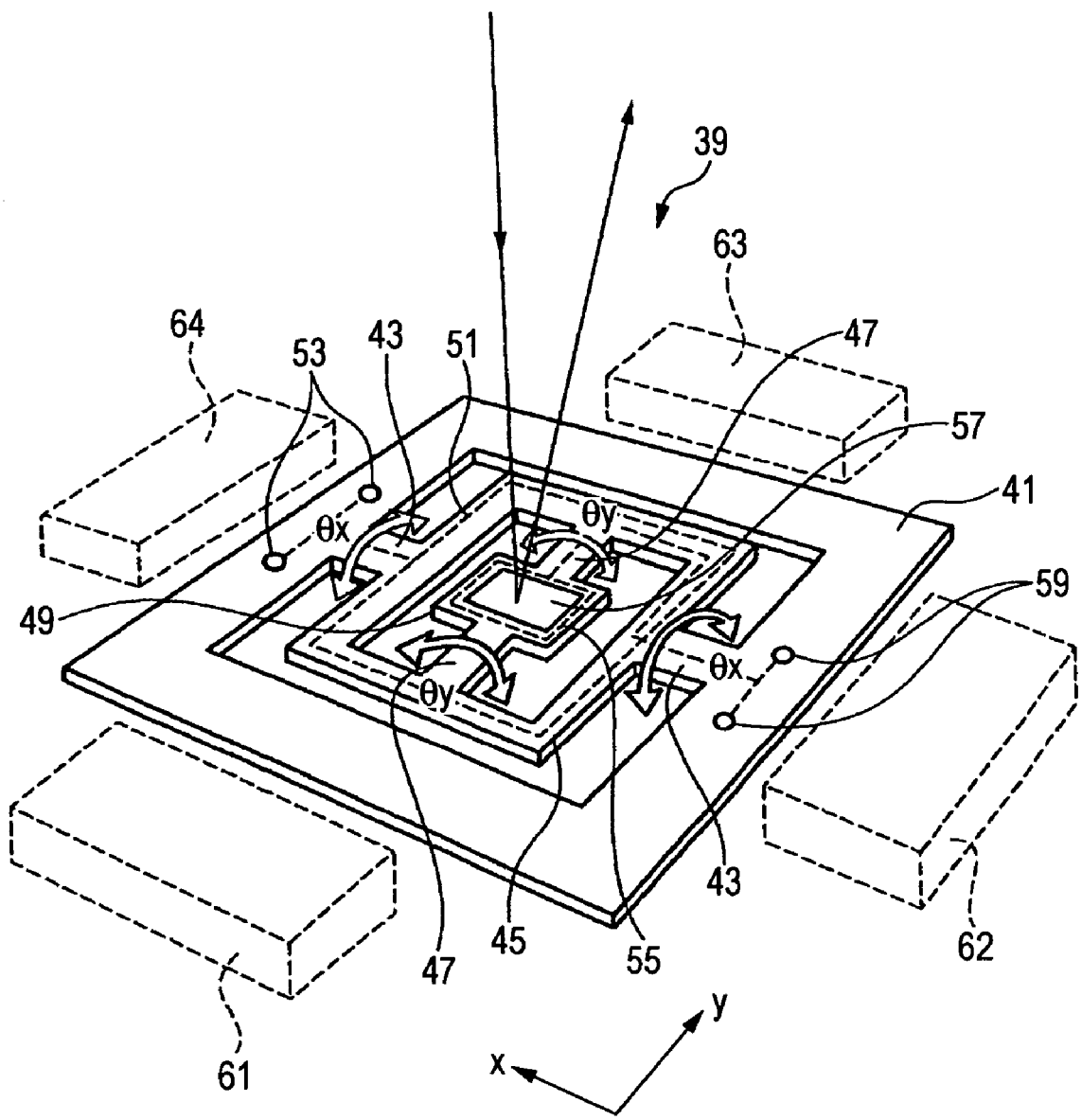
FIG. 7 is an enlarged view of the planar electromagnetic actuator.

FIG. 6 is a principal configurative view of the light beam scanning display using a planar electromagnetic actuator, and an enlarged view of the planar electromagnetic actuator is shown in FIG. 7.

In the present variation, a planar electromagnetic actuator that swings a reflecting mirror supported by the torsion bar by using an electromagnetic force, as disclosed in JP-A-2003-27055, or the like, for example, is employed as the deflecting section.

A planar electromagnetic actuator 39 is constructed such that a frame-like outer movable plate 45 is swingably supported by outer torsion bars 43 on a fixing portion 41 on a substrate, and also a plate-like inner movable plate 49 is swingably supported by inner torsion bars 47, the axial direction of which intersects orthogonally with the outer torsion bar 43, on the outer movable plate 45. An outer driving coil 51 (which is schematically shown by one dotted line in FIG. 7) for generating a magnetic field when a current is supplied is formed in the outer movable plate 45. This outer driving coil 51 is connected electrically to a pair of outer electrode terminals 53 formed in the fixing portion 41 via one of the outer torsion bars 43. An inner driving coil 55 (which is schematically shown by one dotted line in FIG. 7) for generating a magnetic field on a surface of the peripheral portion when a current is supplied is formed around the inner movable plate 49. A reflecting mirror 57 formed of a thin film such as aluminum, gold, or the like is formed on a surface of the inner movable plate 49. The inner driving coil 55 passes through the outer movable plate 45 via one inner torsion bar 47, and then is connected electrically to a pair of inner electrode terminals 59 in the fixing portion 41 via the other side of the outer torsion bars 43.

Also, permanent magnets 61, 62, 63, 64 are arranged around the movable plates 45, 49 as a static magnetic field generating section. This static magnetic field generating section applies a static magnetic field to the driving coils opposing to the movable plates 45, 49 that are parallel with the axial directions of the outer and inner torsion bars 43, 47 respectively. In this case, the static magnetic field generating section is not limited to the illustrated permanent magnet, and the arrangement is not limited to the illustrated one.

The planar electromagnetic actuator 39 constructed as above cooperates with the static magnetic field generating section when a current is supplied to the outer driving coil 51, so that the outer movable plate 45 is turned around the outer torsion bars 43 in the θx direction. Also, the planar electromagnetic actuator 39 cooperates with the static magnetic field generating section when a current is supplied to the inner driving coil 55, so that the inner movable plate 49 is turned around the inner torsion bars 47 in the θy direction. As a result, the reflecting mirror 57 can be turned in both the θx and θy directions and thus the laser beams can be scanned in the horizontal and vertical directions. In the present configuration, it is preferable that the inner torsion bars 47 that can be driven at a high frequency should be employed in the horizontal scanning drive.

According to the planar electromagnetic actuator constructed as above, a configuration of the deflection driving portion 25 can be downsized much more, and thus the drive control can be executed stably at a high speed.

Second Embodiment

Next, a second embodiment of the light beam scanning display, in which the RGB light sources are sealed in the package, according to the present invention will be explained hereunder.

Figure 8A:
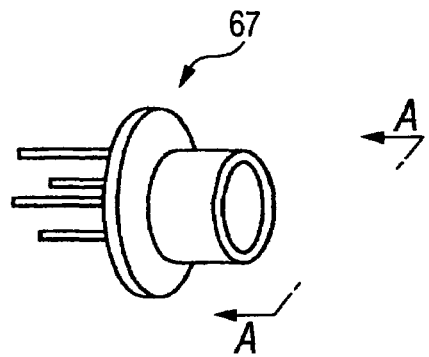
FIG. 8A is a configurative view of a light source sealed in a package, which is an external perspective view.
Figure 8B:
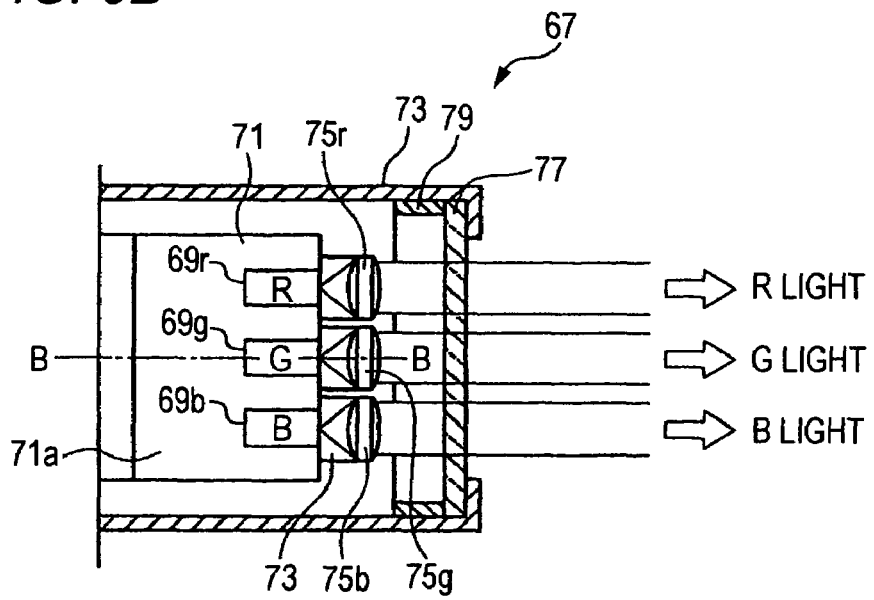
FIG. 8B is a configurative view of a light source sealed in a package, which is an A-A sectional view.

FIG. 8 is a configurative view of a light source sealed in a package, wherein (a) is an external perspective view and (b) is an A-A sectional view, and (c) is a B-B sectional view.

In the present embodiment, as shown in FIG. 8(*a*), a light source 67 is a packaged parts that has terminals on the opposite side to the light emergent side and has the sealed light source. Also, as shown in FIG. 8(*b*), the light source 67 is constructed such that three primary color laser light sources, i.e., an R light source 69*r*, a G light source 69*g*, a B light source 69*b*, are arranged closely to each other on a flat surface 71*a* of a stem 71 and then the stem 71 is built in a cap 73.

Figure 8C:
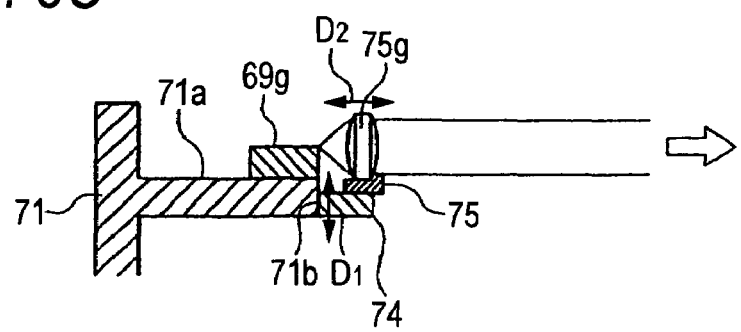
FIG. 8C is a configurative view of a light source sealed in a package, which is a B-B sectional view.

Also, lenses 75r, 75g, 75b are arranged in the light source 67 to correspond to the laser beams emitted from the RGB light sources respectively. As shown in FIG. 8(c), the lenses 75r, 75g, 75b are supported by a first block 74, which is projected from a top end portion 71b of the stem 71 to move in the vertical direction (D1 direction in FIG. 8(c)), and a second block 75, which is moved on the first block 74 in the longitudinal direction (D2 direction in FIG. 8(c)) of the optical path, in such a fashion that their optical axes can be adjusted.

A protection transparent plate 77 for preventing the dust from entering into the inside is fixed by a collar 79 on the inside of the cap 73.

When the light source 67 formed as one package is applied instead of the light sources 11r, 11g, 11b and the lenses 19r, 19g, 19b shown in FIG. 1, an install space of the light source can be reduced widely and also the optical paths of the laser beams can be simplified. Therefore, a further miniaturization of the light beam scanning display can be achieved.

Since the lenses 75r, 75g, 75b can be arranged with high precision, a loss of the light can be reduced.

Third Embodiment

Next, a third embodiment of the light beam scanning display according to the present invention, in which the RGB light sources are constructed as one package and also the lenses used to parallelize the laser beams are arranged on the outside of the package, will be explained hereunder.

Figure 9:
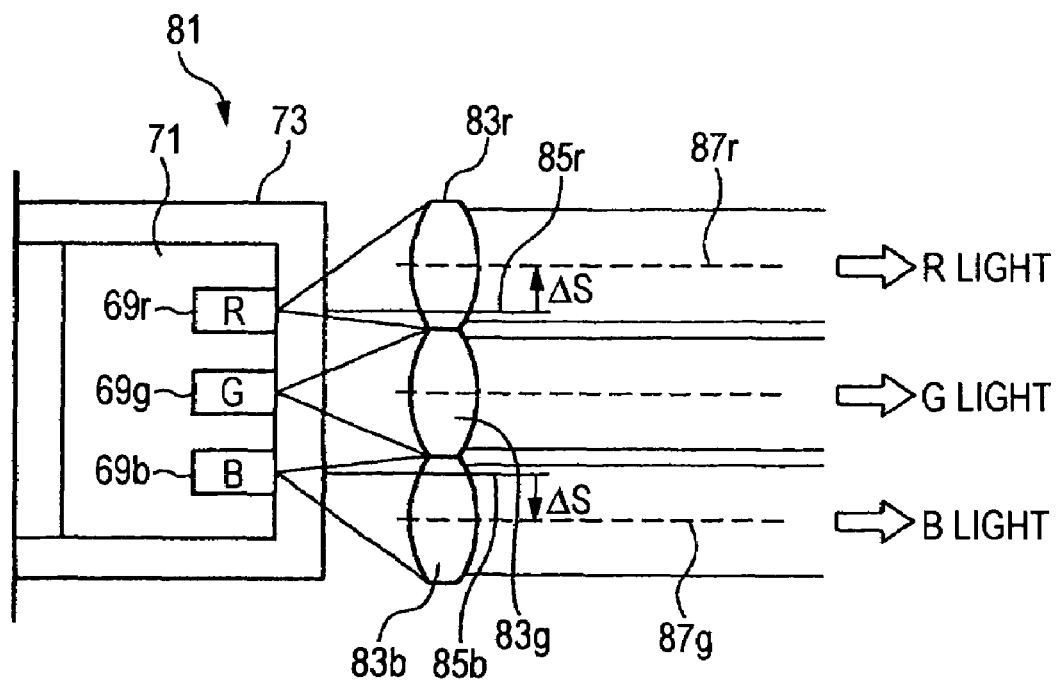
FIG. 9 is a conceptual view showing an arrangement of light sources and lenses according to a third embodiment.

FIG. 9 is a conceptual view showing an arrangement of the light sources and the lenses according to the present embodiment.

In the present embodiment, the R light source 69r, the G light source 69g, the B light source 69b of a light source 81 are arranged closely to each other on the stem 71, but lenses 83r, 83g, 83b used to parallelize the laser beams are arranged on the outside of the package of the light source 81.

The lenses 83r, 83g, 83b are provided to respond to the laser beams respectively. Also, the lens 83r is arranged to deviate its optical axis 87r from a beam center 85r of the R light source 69r by Δs. Also, the lens 83b is arranged to deviate its optical axis 87b from a beam center 85b of the B light source 69b by Δs.

Accordingly, when the laser beams are converted into the parallel lights by using the lens that is excellent in the condensing property and has a large NA value, the RGB laser beams can be emitted at a desired interval from the light source 81.

A single lens may be fitted together as the lenses 83r, 83g, 83b, but an integrated lens may be used as the lenses 83r, 83g, 83b.

Figure 10A:
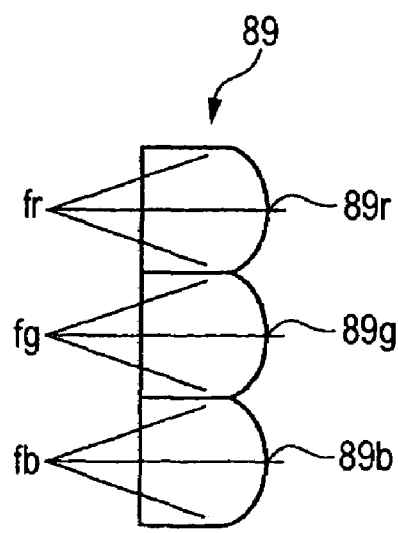
FIG. 10A is a configurative view of a lens array as an example of an integrated lens, which is a side view of the lens.
Figure 10B:
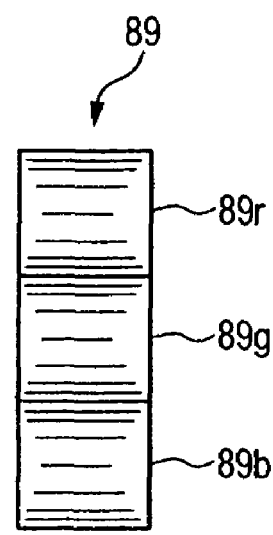
FIG. 10B is a configurative view of a lens array as an example of an integrated lens, which is a front view when viewed from the light emergent side.

A configurative view of a lens array as an example of an integrated lens is shown in FIG. 10, wherein (a) is a side view of the lens and (b) is a front view when viewed from the light emergent side.

When a lens array 89 shown in FIG. 10 is employed, an alignment of the optical axes of the laser beams is not needed in assembling the light source 81, and thus the alignment can be made simple. Therefore, merely when the optical axis is aligned with the G light source 69g or the lens array 89 is fitted into the casing portion (not shown), the laser beam of the R light source 69r or the B light source 69b can be emitted simply and exactly to a predetermined optical axis position.

<Variation>

Here, the configuration in which both the lenses 75r, 75g, 75b in the above package and the lenses 83r, 83g, 83b out of the package are provided can be employed.

Figure 11:
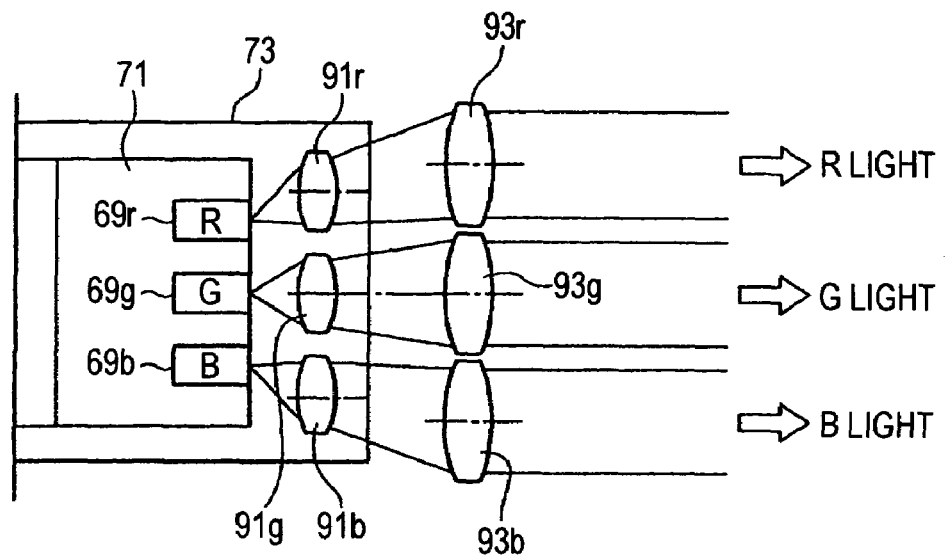
FIG. 11 is a configurative view of a light source when lenses for parallelizing a beam are arranged on the inner side and the outer side of the package in which the light sources are sealed respectively.

FIG. 11 shows a configurative view of the light source when the lenses for parallelizing the beam are arranged on the inner side and the outer side of the package in which the light sources are sealed respectively.

Lenses 91r, 91g, 91b are arranged on the inner side of the cap 73 to correspond to the laser beams respectively, and lenses 93r, 93g, 93b are arranged on the outer side of the cap 73. The optical axes of the lenses 91r, 93r and 91b, 93b, which correspond to the laser beams from the R light source 69r and the B light source 69b, are deviated respectively to expand an interval between the laser beams. Accordingly, a diameter of the lens arranged on the outer side can be increased larger and thus the laser beam can be irradiated at high efficiency. As a result, a high luminance can be obtained and the drawing can be realized on a large screen in a distant location.

Fourth Embodiment

Next, a fourth embodiment of the light beam scanning display according to the present invention, in which the laser beams from the RGB light sources are converged by using the optical fibers, will be explained hereunder.

Figure 12:
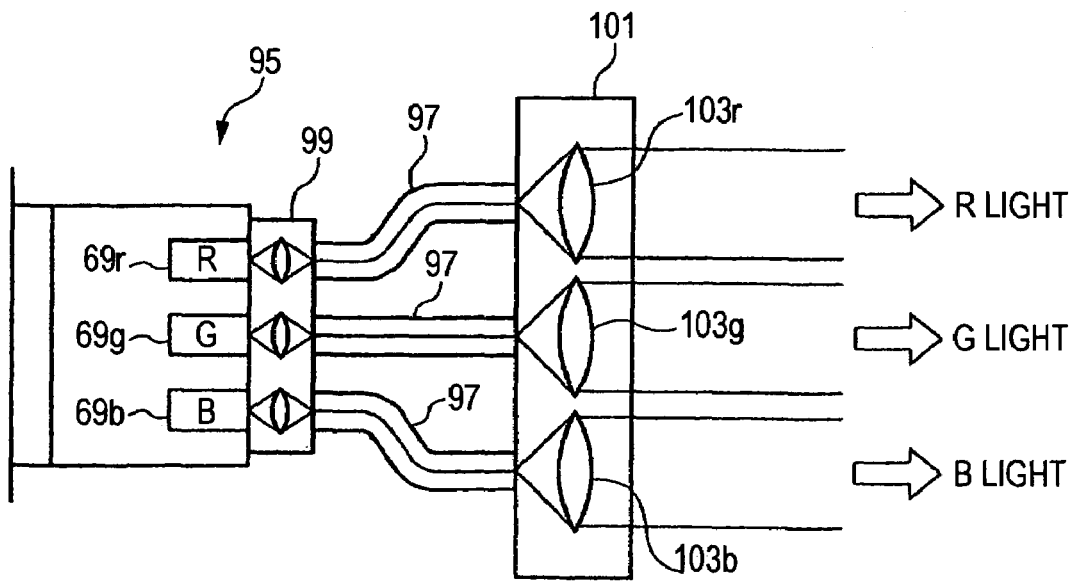
FIG. 12 is a configurative view showing an example of an arrangement of light sources and lenses of an embodiment, in which optical fibers are connected to packaged RGB light sources respectively.

FIG. 12 is a configurative view showing an example of an arrangement of the light sources and the lenses of the present embodiment, in which the optical fibers are connected to the packaged RGB light sources respectively.

The laser beams emitted from a light source 95 are introduced into a connecting portion 99 provided on the incident side of optical fibers 97, and then introduced into the optical fibers 97. Then, respective color laser beams are emitted in parallel from an emergent block 101 provided on the emergent side of the optical fibers 97 via lenses 103r, 103g, 103b used to parallelize the laser beams.

According to this configuration, even though individual RGB light sources 69r, 69g, 69b are arranged in close vicinity to each other, respective color laser beams can be led arbitrarily by the optical fibers 97. Thus, a degree of freedom in arranging the optical paths can be increased, and thus a margin of design can be improved. Therefore, the optical system of the light beam scanning display can be downsized much more by employing the light source using the optical fibers.

Fifth Embodiment

Next, a fifth embodiment of the light beam scanning display according to the present invention, in which the G light source out of the RGB light sources is constructed by using an optical wavelength converter (referred to as an "SHG element" hereinafter), will be explained hereunder.

Figure 13A:
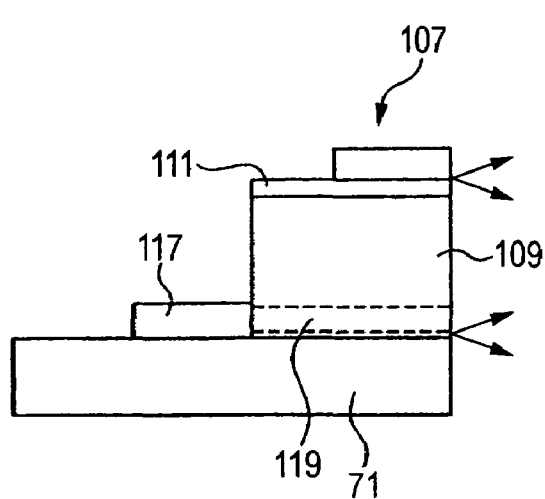
FIG. 13A is a schematic configurative view of RGB light sources using an SHG element as the G light source, which is a side view.
Figure 13B:
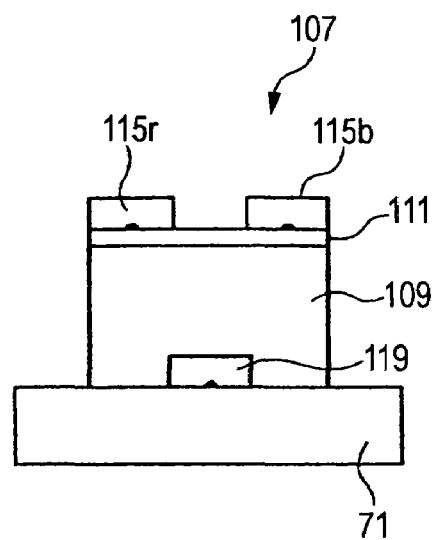
FIG. 13B is a schematic configurative view of RGE light sources using an SHG element as the G light source, which is a front view when viewed from the light emergent side.

A schematic configurative view of the RGB light sources using the SHG element as the G light source is shown in FIG. 13, wherein (a) is a side view, and (b) is a front view when viewed from the light emergent side.

In a light source 107, an R light source 115r and a B light source 115b as the laser light source are formed at a predetermined interval on the upper surface of the stem 71 as the Si bench via a heat sink 109 and an electrode layer 111. Also, an LD element 117 as a distributed Bragg reflector (DBR) is arranged on the inside of the heat sink 109 in an intermediate position between the a light source 115r and the B light source 115b. An SHG element 119 is formed in the interior of the heat sink 109 on the light emergent side of the LD element 117. The heat sink 109 protects the SHG element 119 from the external heat source.

The electrode layer 111 is formed by Au plating, or the like, and the heat sink 109 is formed of Cu, AlN, diamond, or the like. The SHG element 119 is formed by providing an optical waveguide and periodic domain inverting portions on a crystal substrate made of $LiNbO_3$(MgO-LN) in which MgO is doped, for example.

Figure 14:
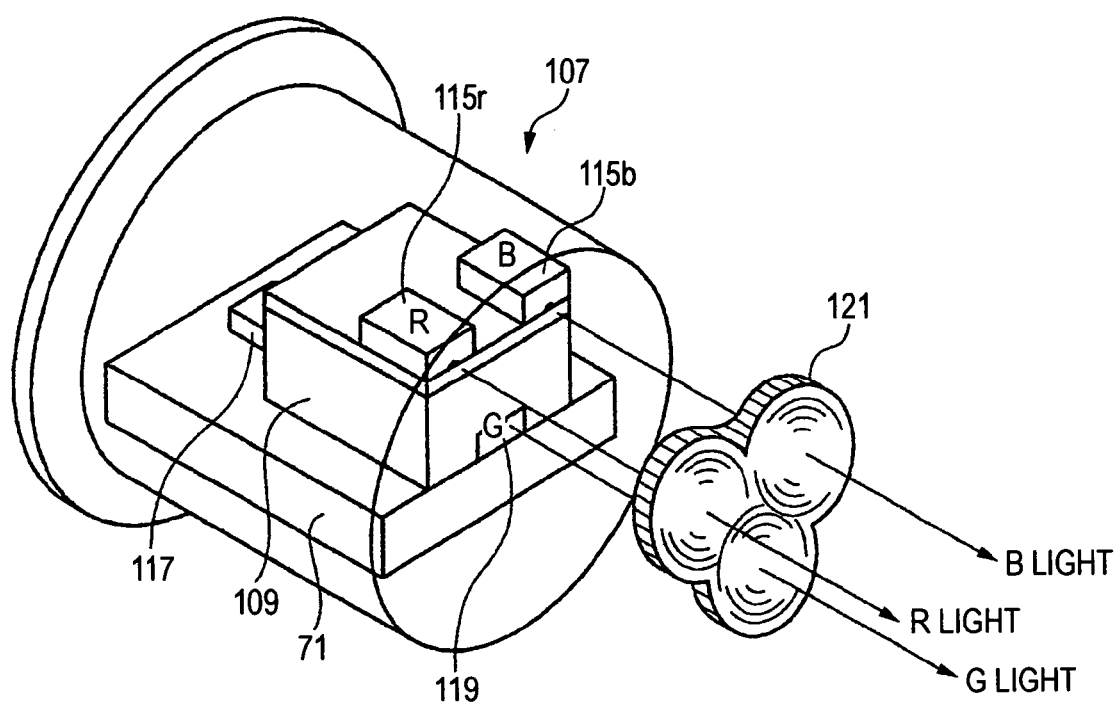
FIG. 14 is a conceptual perspective view showing the light source shown in FIG. 13.

A conceptual perspective view of the light source having the above configuration is shown in FIG. 14.

The light source 107, in which the RGB light sources are sealed in one package, emits the laser beams from the R light source 115r and the B light source 115b, and emits the laser beam that is output by converting the light wave of the LD element into the green wavelength range by the SHG element 119.

A lens array 121 used to parallelize the laser beams is provided ahead on the optical paths of the laser beams. This lens array 121 is obtained by forming the lenses, which parallelizes the laser beam respectively, at three locations and is formed with a resin, or the like by the integral molding.

Therefore, one pixel of so-called RGB delta type is formed.

According to the present embodiment, the G light source can be constructed inexpensively and a cost reduction can be attained.

The above-explained light beam scanning display of the embodiments can be applied to the projector device that is small in size and is ready to carry, or the like, for example, and also can be utilized as various image forming apparatuses such as the advertising medium, the small exposure unit, and the like. Also, if a sufficient quantity of light can be obtained, the light emitted from the light emitting diode can be utilized as the light source. In addition, in the present embodiment RGB colors are employed as three primary colors, but three primary colors are not limited to them. The variation can be applied such that other color is added, and the like.

The entire disclosure of each and every foreign patent application from which the benefit of foreign priority has been claimed in the present application is incorporated herein by reference, as if fully set forth.

What is claimed is:

1. A light beam scanning display for displaying an image on a drawing screen by modulating laser beams from three primary color light sources, the three primary color light sources being arranged in close vicinity to each other, based on image data respectively and then scanning the laser beams, the light beam scanning display comprising:
    a parallelizing section that parallelizes respective laser beams;
    wherein the laser beams being parallelized by the parallelizing section to form one pixel of a drawn image on the drawing screen via different optical paths such that optical axes of the laser beams do not overlap with each other, and
    wherein the parallelized laser beams form the one pixel at the drawing screen.

2. A light beam scanning display according to claim 1, wherein the parallelizing section comprises lenses that are provided to correspond to the laser beams respectively.

3. A light beam scanning display according to claim 2, wherein the lenses comprises at least one lens arranged to deviate its optical axis from a center of the corresponding laser beam.

4. A light beam scanning display according to claim 1, wherein the three primary color light sources are sealed in one package.

5. A light beam scanning display according to claim 4, wherein the parallelizing section comprises lenses that are provided to correspond to the laser beams respectively, and
    wherein the lenses are sealed in an interior of the package.

6. A light beam scanning display according to claim 2, wherein the lenses are constructed as a lens array in which the lenses that parallelizes the laser beams respectively are integrated together.

7. A light beam scanning display according to claim 4, wherein the lenses are constructed as a lens array in which the lenses that parallelizes the laser beams respectively are integrated together.

8. A light beam scanning display according to claim 1, further comprising:
    optical fibers that introduces the laser beams from the light sources respectively to transmit;
    wherein the parallelizing section comprises lenses that are respectively provided to light emergent sides of the optical fibers to parallelize each of emergent beams from the optical fibers, such that the optical axes of the laser beams emitted from the optical fibers do not overlap with each other.

9. A light beam scanning display according to claim 2, wherein the laser beams are deflected by a deflecting device for display on the drawing screen such that the optical axes of the laser beams diverge along a single axis.

10. A light beam scanning display according to claim 4, wherein the laser beams are deflected by a deflecting device for display on the drawing screen such that the optical axes of the laser beams diverge along a single axis.

11. A light beam scanning display according to claim 5, wherein the lenses respectively correspond to beams having different wavelengths (colors), and the lenses parallelize the respective beams having different wavelengths such that the parallelized beams are substantially parallel to each other.

12. The light beam scanning display according to claim 1, wherein the parallelized laser beams form one pixel of the drawn image on the drawing screen via the different optical paths such that optical axes of the parallelized laser beams do not overlap with each other throughout the different optical paths.

* * * * *